(12) United States Patent
Barrau et al.

(10) Patent No.: US 12,474,599 B2
(45) Date of Patent: Nov. 18, 2025

(54) METHODS FOR DESIGNING AN OPHTHALMIC TINTED LENS AND OPHTHALMIC TINTED LENSES, AND CORRESPONDING OPHTHALMIC TINTED LENS

(71) Applicant: Essilor International, Charenton-le-Pont (FR)

(72) Inventors: Coralie Barrau, Charenton-le-Pont (FR); Gildas Marin, Charenton-le-Pont (FR); Cyril Guilloux, Charenton-le-Pont (FR); Laurent Calixte, Paris (FR); Elise Poletto, Charenton-le-Pont (FR); Camille Ehrismann, Charenton-le-Pont (FR); Gilles Le Saux, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 838 days.

(21) Appl. No.: 17/775,793

(22) PCT Filed: Dec. 15, 2020

(86) PCT No.: PCT/EP2020/086123
§ 371 (c)(1),
(2) Date: May 10, 2022

(87) PCT Pub. No.: WO2021/122530
PCT Pub. Date: Jun. 24, 2021

(65) Prior Publication Data
US 2022/0397774 A1 Dec. 15, 2022

(30) Foreign Application Priority Data
Dec. 16, 2019 (EP) .................................. 19306654

(51) Int. Cl.
*G02C 7/02* (2006.01)
*G02C 7/06* (2006.01)
*G02C 7/10* (2006.01)

(52) U.S. Cl.
CPC ............. *G02C 7/027* (2013.01); *G02C 7/061* (2013.01); *G02C 7/104* (2013.01)

(58) Field of Classification Search
CPC ........ G02C 7/027; G02C 7/061; G02C 7/104; G02C 7/024; G02C 7/028; G02C 7/06;
(Continued)

(56) References Cited

U.S. PATENT DOCUMENTS

2012/0013847 A1* 1/2012 Carmon ................. G02C 7/105
 351/159.74
2012/0262668 A1* 10/2012 McCarty ................ G02C 7/063
 351/159.75
(Continued)

FOREIGN PATENT DOCUMENTS

CN 106716231 A 5/2017
EP 2 506 064 A2 10/2012
(Continued)

OTHER PUBLICATIONS

ISO 13666 15.5 (Year: 2012).*
(Continued)

*Primary Examiner* — Travis S Fissel
(74) *Attorney, Agent, or Firm* — Oblon, McClelland, Maier & Neustadt, L.L.P.

(57) ABSTRACT

It is proposed a method for defining a design of an ophthalmic tinted lens provided with a turquoise blue ophthalmic filter. It is provided at least one optical parameter value that is prescribed with reference to a clear ophthalmic lens. At least one non-null optical power value is determined from said at least one prescribed optical parameter value. At least one reduction value is obtained. At least one reduced optical power value is calculated in function of said at least one non-null optical power value and said at least one reduction value. The ophthalmic tinted lens design is defined on the basis of said at least one reduced optical power value. Methods for defining a design of a first and a second ophthalmic tinted lens are also proposed. It is also proposed a corresponding ophthalmic tinted lens.

16 Claims, 4 Drawing Sheets

(58) Field of Classification Search
CPC .......... G02C 7/10; G02C 7/102; G02C 7/107;
G02C 7/108
USPC .................................................. 351/159.74
See application file for complete search history.

(56) References Cited

U.S. PATENT DOCUMENTS

| | | |
|---|---|---|
| 2017/0357105 A1 | 12/2017 | Hernandez-Castaneda et al. |
| 2018/0039096 A1 | 2/2018 | Shioya et al. |
| 2020/0400974 A1 | 12/2020 | De Ayguavives et al. |
| 2020/0400975 A1 | 12/2020 | Barrau et al. |

FOREIGN PATENT DOCUMENTS

| | | |
|---|---|---|
| EP | 3 528 036 A1 | 8/2019 |
| EP | 3 528 037 A1 | 8/2019 |
| WO | WO 2008/106449 A1 | 9/2008 |
| WO | WO 2019/158717 A1 | 8/2019 |

OTHER PUBLICATIONS

International Search Report issued Mar. 22, 2021 in PCT/EP2020/086123 filed on Dec. 15, 2020, 4 pages.
Extended European Search Report & Written Opinion issued Jun. 9, 2020 in European Application 19306654.5 filed on Dec. 16, 2019, 8 pages.
Combined Chinese Office Action and Search Report issued Jan. 11, 2024 in Chinese Patent Application No. 202080083210.5 (with English translation), 19 pages.

\* cited by examiner

METHODS FOR DESIGNING AN OPHTHALMIC TINTED LENS AND OPHTHALMIC TINTED LENSES, AND CORRESPONDING OPHTHALMIC TINTED LENS

TECHNICAL FIELD

The invention relates to ophthalmic tinted lenses and corresponding designing and producing methods.

DISCUSSION OF THE BACKGROUND

Tinted eyeglasses are well-known for long time for protecting the eyes against excessive light, in particular excessive sunlight. They are designed for filtering out UV light which is harmful for the human eyes, and also part of the visible light so as to avoid the wearer to be dazzled.

For producing solar ophthalmic tinted lens, it is known to apply on the ophthalmic lens an optical tinting filter that provides a sensibly homogeneous filtering effect for all the wavelengths of the visible spectral range.

It has to be noted that when a wearer is prescribed a power correction by an ophthalmologist, this power correction has been determined in view of producing a clear ophthalmic lens, that is to say an ophthalmic lens that is not tinted. Thus, when the wearer needs solar ophthalmic tinted eyeglass, the tinted ophthalmic lenses are produced based on the prescribed power correction that has been determined in the context of a clear ophthalmic lens.

However, using ophthalmic tinted lenses having a given prescribed power correction, may reduce the visual acuity by comparison with using clear ophthalmic lenses having same given prescribed power correction, because of the optical tinting filter. Furthermore, the wearer may suffer from visual aberrations that can result from the impact of the tinted filter on its pupil and that can also result from the prescribed power correction.

There is thus a need to provide methods for defining a design for ophthalmic tinted lens(es), that enable to overcome at least part of the drawbacks of the known ophthalmic tinted lenses.

SUMMARY

Embodiments of the present disclosure provide a method for defining a design of an ophthalmic tinted lens provided with an ophthalmic filter having an average transmittance value over a range of wavelengths between 465-495 nm that is greater than a visual transmission value over a range of wavelengths 380-780 nm, said ophthalmic tinted lens being intended for an eye of a wearer, said method comprising the followings steps:
 providing at least one optical parameter value that is prescribed with reference to a clear ophthalmic lens;
 determining at least one non-null optical power value from said at least one prescribed optical parameter value;
 obtaining at least one reduction value;
 calculating at least one reduced optical power value in function of said at least one non-null optical power value and said at least one reduction value;
 defining the ophthalmic tinted lens design on the basis of said at least one reduced optical power value.

Such method enables to have a lens or lenses and thus corresponding eyeglasses which provide an efficient protection against excessive light intensity thanks to the particular ophthalmic filter, without increasing optical aberrations or reducing image quality of human vision thanks to the reduction of the optical power value that is made possible through the use of said particular ophthalmic filter.

Classical sunglass filters provide a sensibly homogeneous filtering effect for all the wavelengths of the visible spectral range. Such reduction in the visible light causes the pupillary constriction to lessen, which increases in turn optical aberrations that exist in the image formed on the retina, and also reduces the depth of field. Therefore, by increasing the pupillary diameter, the classical solar tinted eyeglasses cause a reduction in the image quality of human vision.

On the contrary, the used particular ophthalmic filter enables keeping the pupils constrained, what provides the wearer with better image quality of human vision allowing to reduce the optical power value of the lens with regard to prescribed optical correction. Indeed, the smaller the pupil size, the lower the optical aberrations of the light entering into the eye and the higher the visual acuity and the depth of field. Thus, each lens intended for an eye of the wearer can be provided with appropriate reduced power correction avoiding a too high value that would cause increased optical aberrations.

Furthermore, reducing the optical power value of the lenses makes it easier for wearers to adjust to their new glasses. Reducing the power correction of the lens or lenses may also lead to thinner lens or lenses.

According to a particular aspect, the ratio defined by average transmittance value divided by the visual transmission value is superior to 1.5, preferably superior or equal to 1.7.

According to a particular aspect, the average transmittance value is higher than 32%.

According to a particular aspect, the visual transmission value is lower than 18%.

According to a particular aspect, said at least one reduction value is between 0.125 and 0.75 diopter.

According to a particular aspect, said reduction value is read in a table or calculated as a function of a highest determined non-null optical power value among said at least one non-null optical power value.

According to a particular aspect, the ophthalmic tinted lens being a single vision ophthalmic tinted lens, said at least one prescribed optical parameter value includes at least one of:
 a prescribed sphere value;
 a prescribed cylinder value;
 and said at least one determined non-null optical power value includes at least one of:
 a determined non-null sphere value;
 a determined non-null sum of a sphere and of a cylinder value.

According to a particular aspect, the ophthalmic tinted lens being a progressive ophthalmic tinted lens, said at least one prescribed optical parameter value includes at least one of:
 a prescribed sphere value for far vision;
 a prescribed sphere value for near vision;
 a prescribed cylinder value for far vision;
 a prescribed cylinder value for near vision;
 a prescribed addition;
 and said at least one determined non-null optical power value includes at least one of:
 a determined non-null sphere value for far vision;
 a determined non-null sphere value for near vision;
 a determined non-null sum of a sphere value for far vision and of a cylinder value for far vision;

a determined non-null sum of a sphere value for near vision and of a cylinder value for near vision.
a determined non-null sum of a sphere value for far vision and of an addition;
a determined non-null sum of a sphere value for far vision and of an addition and of a cylinder value for far vision;
a determined non-null sum of a sphere value for near vision and of an addition and of a cylinder value for near vision.

According to a particular aspect, for calculating said at least one reduced optical power value, the method includes the steps of:
determining, in absolute terms, a highest optical power value among said at least one determined non-null optical power value;
calculating said at least one reduced optical power value in function of said highest optical power value and said at least one reduction value.

It is also proposed a method for producing an ophthalmic tinted lens, said method comprising producing the ophthalmic tinted lens based on an ophthalmic tinted lens design as defined in the above method, and said ophthalmic filter.

It is also proposed a method for producing an ophthalmic tinted lens, said method comprising:
defining a design of an ophthalmic tinted lens provided with an ophthalmic filter by executing a corresponding method as proposed above;
producing the ophthalmic tinted lens based on said defined ophthalmic tinted lens design and said ophthalmic filter.

It is also proposed a method for defining a design of each of a first and a second ophthalmic tinted lenses, intended for a first and a second eye of an identified wearer,
each of said first and second ophthalmic tinted lenses being provided with an ophthalmic filter having an average transmittance value over a range of wavelengths between 465-495 nm that is greater than a visual transmission value over a range of wavelengths 380-780 nm,
wherein, said method comprises the steps of, for each of said first and a second ophthalmic tinted lenses:
providing at least one optical parameter value that is prescribed with reference to a clear ophthalmic lens;
determining at least one non-null optical power value from said at least one prescribed optical parameter value; and
said method further comprising the steps of:
determining, in absolute terms, a highest optical power value among the at least one non-null optical power value determined for both the first and the second ophthalmic tinted lenses;
said method further comprising the steps of:
obtaining at least one reduction value;
for the one of said first and a second ophthalmic tinted lenses, referred as to the main lens, to which is attached said highest optical power value, calculating at least one reduced optical power value in function of said highest optical power value and said at least one reduction value;
for the other one of said first and a second ophthalmic tinted lenses, referred as to the auxiliary lens, calculating, at least one another reduced optical power value in function of:
a non-null optical power value of at least one optical power of said auxiliary lens, said at least one optical power corresponding to the at least one optical power of the main lens whose non-null optical power value is said highest optical power value, and said at least one reduction value;
said method further comprising:
defining a design for said main lens on the basis of said at least one reduced optical power value;
defining a design for said auxiliary lens on the basis of said at least one another reduced optical power value.

It is also proposed a method for defining a design of each of a first and a second ophthalmic tinted lenses, intended for a first and a second eye of an identified wearer,
each of said first and second ophthalmic tinted lenses being provided with an ophthalmic filter having an average transmittance value over a range of wavelengths between 465-495 nm that is greater than a visual transmission value over a range of wavelengths 380-780 nm,
wherein, said first eye being a dominant eye, the method comprises the steps of, for each of said first and a second ophthalmic tinted lenses:
providing at least one optical parameter value that is prescribed with reference to a clear ophthalmic lens;
determining at least one non-null optical power value from said at least one prescribed optical parameter value; and
said method further comprising, for the first ophthalmic tinted lens intended to the dominant eye, the steps of:
determining, in absolute terms, a highest optical power value among the at least one non-null optical power value determined for said first ophthalmic tinted lens intended to the dominant eye;
obtaining at least one reduction value;
said method further comprising, the steps of:
for the first ophthalmic tinted lens intended to the dominant eye, to which is attached said highest optical power value, calculating at least one reduced optical power value in function of said highest optical power value and said at least one reduction value;
for the second ophthalmic tinted lens, calculating another reduced optical power value in function of:
a non-null optical power value of at least one optical power of said second ophthalmic tinted lens, said at least one optical power corresponding to the at least one optical power of the first ophthalmic tinted lens whose non-null optical power value is, in absolute terms, said highest optical power value, and said at least one reduction value;
said method further comprising:
defining a design for said first ophthalmic tinted lens on the basis of said at least one reduced optical power value;
defining a design for said for said second ophthalmic tinted lens on the basis of said at least one another reduced optical power value.

According to a particular aspect, the ophthalmic filter of said first and second ophthalmic tinted lenses are substantially identical.

It is also proposed a method for producing a first and a second ophthalmic tinted lenses, said method comprising producing the first ophthalmic tinted lens and the second ophthalmic tinted lens based on the designs defined for said first ophthalmic tinted lens and said second ophthalmic tinted lens according to any one of the methods proposed above, and based on said ophthalmic filter provided for each of the first ophthalmic tinted lens and the second ophthalmic tinted lens.

It is also proposed a method for producing a first and a second ophthalmic tinted lenses, said method comprising:
- defining designs for said first ophthalmic tinted lens and said second ophthalmic tinted lens, by executing a corresponding method as proposed above;
- producing the first ophthalmic tinted lens and the second ophthalmic tinted lens based on said defined designs, and based on said ophthalmic filter provided for each of the first ophthalmic tinted lens and the second ophthalmic tinted lens.

It is also proposed a non-transitory computer readable medium including a computer program product comprising one or more stored sequences of instructions that are accessible to a processor and which, when executed by the processor, causes the processor to carry out any one of the methods proposed above.

According to embodiments, it is also proposed an ophthalmic tinted lens provided with an ophthalmic filter having an average transmittance value over a range of wavelengths between 465-495 nm that is greater than a visual transmission value over a range of wavelengths 380-780 nm, wherein, the ophthalmic tinted lens being associated with at least one optical parameter value that is prescribed with reference to a clear ophthalmic lens, the ophthalmic tinted lens has at least one optical power value measured on said ophthalmic tinted lens that differs from a corresponding optical power value determined from said at least one prescribed optical parameter value.

According to embodiments, it is also proposed an assembly comprising an ophthalmic tinted lens provided with an ophthalmic filter having an average transmittance value over a range of wavelengths between 465-495 nm that is greater than a visual transmission value over a range of wavelengths 380-780 nm. The assembly also comprises a document, such as paper included with the lens in a sleeve, the document being provided with at least one optical parameter value that is prescribed with reference to a clear ophthalmic lens. The ophthalmic tinted lens has at least one optical power value measured on said ophthalmic tinted lens that differs from a corresponding optical power value determined from said at least one prescribed optical parameter value.

The assembly can also include two lenses intended to the eyes of the wearer and a document with corresponding prescribed optical parameter values.

According to embodiments, it is also proposed an assembly comprising:
- a document, such as a paper, on which is provided at least one optical parameter value that is prescribed with reference to a clear ophthalmic lens;
- an ophthalmic tinted lens provided with an ophthalmic filter having an average transmittance value over a range of wavelengths between 465-495 nm that is greater than a visual transmission value over a range of wavelengths 380-780 nm,
- wherein, the ophthalmic tinted lens being associated with said at least one prescribed optical parameter value, the ophthalmic tinted lens has at least one optical power value measured on said ophthalmic tinted lens that differs from a corresponding optical power value determined from said at least one prescribed optical parameter value.

According to a particular aspect, the value difference between said at least one optical power value measured on said ophthalmic tinted lens and said corresponding optical power value determined from said at least one prescribed optical parameter value is greater than a value of production tolerance, for instance greater than 0.12 Diopters In other words, the correction envisaged is superior to the production tolerance. According to paragraph 5.2.2.2 "Tolerances on the focal power of lenses" from ISO 8980-2 (2004) standard, the production tolerance is 0.12 D, what is inferior to a correction envisaged of for instance 0.125 D.

Measurement of said at least one optical power value on the or each ophthalmic tinted lens can be done with a lensmeter or focimeter.

The or each ophthalmic tinted lens can be obtained according to any one of the methods proposed above. The or each ophthalmic tinted lens can include any one of the features described above or below in the specification.

LIST OF FIGURES

The invention is described in more detail below by way of the figures that show embodiments of the invention.

DETAILED DESCRIPTION

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
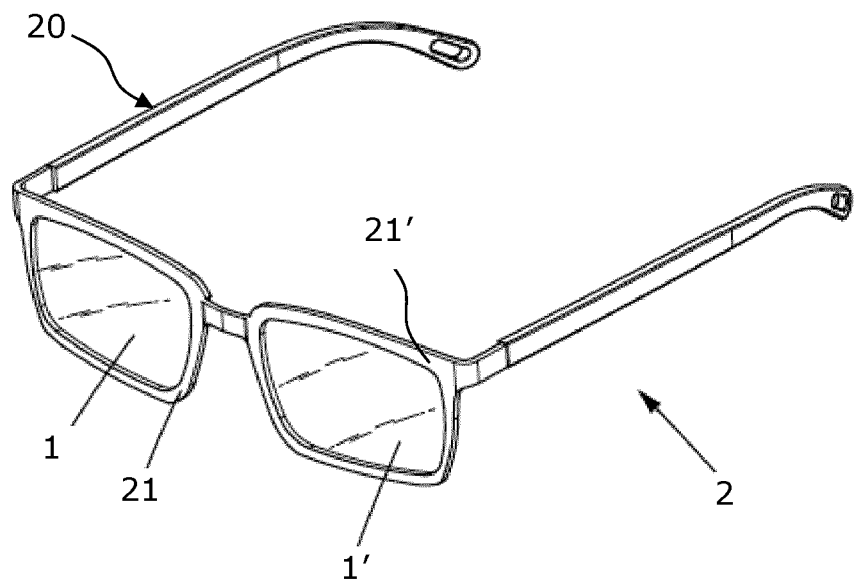
FIG. 1 is a perspective view of spectacles provided with two ophthalmic tinted lens that can be obtained by a method according to an embodiment of the invention.
Figure 2:
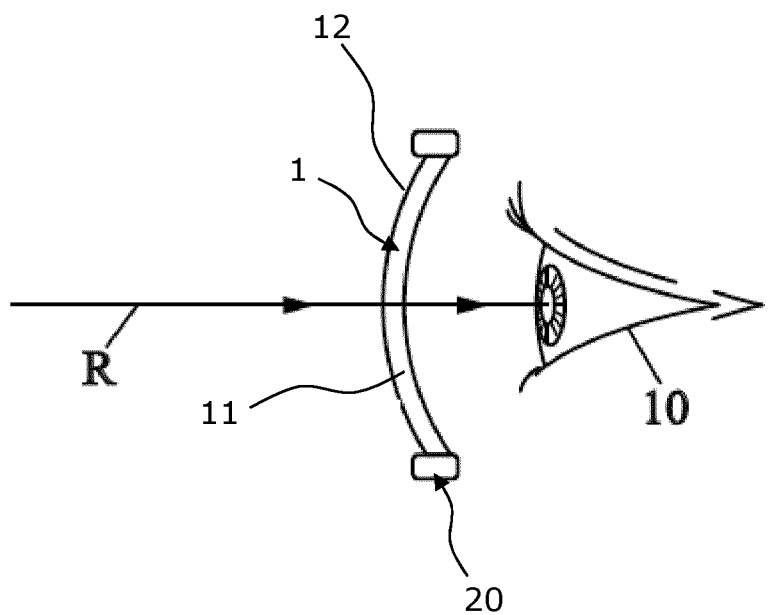
FIG. 2 is a schematic view of an ophthalmic tinted lens mounted in a frame of spectacles, that can be obtained by a method according to an embodiment of the invention, and of an eye that receives a ray light passing through said ophthalmic tinted lens.

FIG. 1 shows spectacles 2 comprising a spectacle frame 20 and two ophthalmic tinted lenses 1, 1'. Each ophthalmic tinted lens 1, 1' is housed in a corresponding lens emplacement 21, 21' of the spectacle frame 20. FIG. 2 further illustrates a ray of light R that passes through the ophthalmic tinted lens 1 positioned in front of a corresponding eye 10 of a wearer provided with the spectacles. The ophthalmic tinted lens 1 is provided with a filter 12. Such FIG. 2 can also apply to the other ophthalmic tinted lens 1' associated with the other eye of the wearer.

Turquoise Blue Ophthalmic Filter

The or each ophthalmic tinted lens to be designed and/or produced is intended to be provided with a particular ophthalmic filter 12, referred as in the following specification to a turquoise blue ophthalmic filter.

The turquoise blue ophthalmic filter has an average transmittance value $T\_tb$ over a range of wavelengths between 465-495 nm that is greater than a visual transmission value $T_V$, over a range of wavelengths 380-780 nm. The range of wavelengths between 465-495 nm corresponds to a turquoise blue light transmission range. Such spectral range controls the non-visual pupillary reflex and the related average transmittance value $T\_tb$ enables transmission of turquoise blue light into an eye 10 so as to limit pupil size. The higher transmittance rate at these particular wavelengths leads to a smaller pupil size in outdoors light levels and a longer sustainability, by comparison with classical solar filters of sunglasses that provide a sensibly homogeneous filtering effect for all the wavelengths of the visible spectral range and that are known to increase pupil size compared to clear lenses, for the same (solar) light exposure. The range of wavelengths 380-780 nm corresponds to the visible light.

According to particular embodiments, the ratio defined by the average transmittance value T_tb divided by the visual transmission value $T_V$ is superior to 1.5, preferably superior or equal to 1.7. For instance, said ratio can be equal to 1.78.

In other words, and as detailed hereafter, it is proposed to reduce the prescribed power correction when having to design and/or produce tinted ophthalmic lens(es) provided with an ophthalmic filter 12 that has $T\_tb/T_V$ superior to a predefined value such as 1.5.

According to embodiments, the average transmittance value T_tb is higher than 32%, what enables to significantly limit the pupil size.

According to particular aspects, the visual transmission value $T_V$ is lower than 18%. Such visual transmission value $T_V$ can be similar to the one of standard solar lenses.

The below proposed reduction of power correction is made possible because of this turquoise blue ophthalmic filter that provides the average transmittance value T_tb over a range of wavelengths between 465-495 nm that is high, for instance T_tb>32%, by comparison with the one of the classical solar filters for which the corresponding average transmittance value T_tb is about 13%, and by comparison with the visual transmission value $T_V$ that is for instance about 18%.

The visual transmission value $T_V$ enables to quantify a light intensity ratio which relates to light effective for human vision. $T_V$ is defined in the standard ISO13666 concerning the formula computation, while the requirements and test method are defined in the standard ISO8980-3. In particular said visual transmission value $T_V$ takes into account the response of the average sensitivity of the eye when submitted to a ray of light.

Preferably, the visual transmission value $T_V$ may be computed using the following first formula:

$$T_V = \frac{\int_{380nm}^{780nm} E_s(\lambda) \cdot V(\lambda) \cdot T(\lambda) \cdot d\lambda}{\int_{380nm}^{780nm} E_s(\lambda) \cdot V(\lambda) \cdot d\lambda}$$

where:
$\lambda$ is the light wavelength within the visible range from 380 nm to 780 nm of the human vision;
$T(\lambda)$ is the spectral transmittance value of the ophthalmic tinted lens at wavelength $\lambda$, expressed as a percentage value;
$V(\lambda)$ is a value at wavelength $\lambda$ of a spectral sensitivity profile V of the human eye for photopic vision; and
$E_s(\lambda)$ is a value at wavelength $\lambda$ of the spectral intensity distribution Es of the solar light.

The spectral transmittance $T(\lambda)$ is expressed as a percentage value, namely ranging between 0 and 100. This leads to the $T_V$ value computed according to formula (1) to range from 0 to 100 too.

The turquoise blue ophthalmic filter 12 can be a film applied on at least one face of a base 11 of the corresponding lens. In particular, the film can be applied on one of the concave and convex faces of the base 11 of the corresponding lens or on both faces.

According to other embodiments, the turquoise blue ophthalmic filter 12 can be obtained by providing a base of the lens whose material is tinted in the mass with a tint that corresponds to said ophthalmic turquoise blue filter 12.

The turquoise blue ophthalmic filter 12 can have various tints (or dyes) and concentrations. According to embodiments, the features of the turquoise blue ophthalmic filter 12 can comprise at least one or a combination of the features of the corresponding ophthalmic filter described in patent applications EP3528036 and EP3528037 which are each incorporated herein by reference in their entireties.

Figure 3:
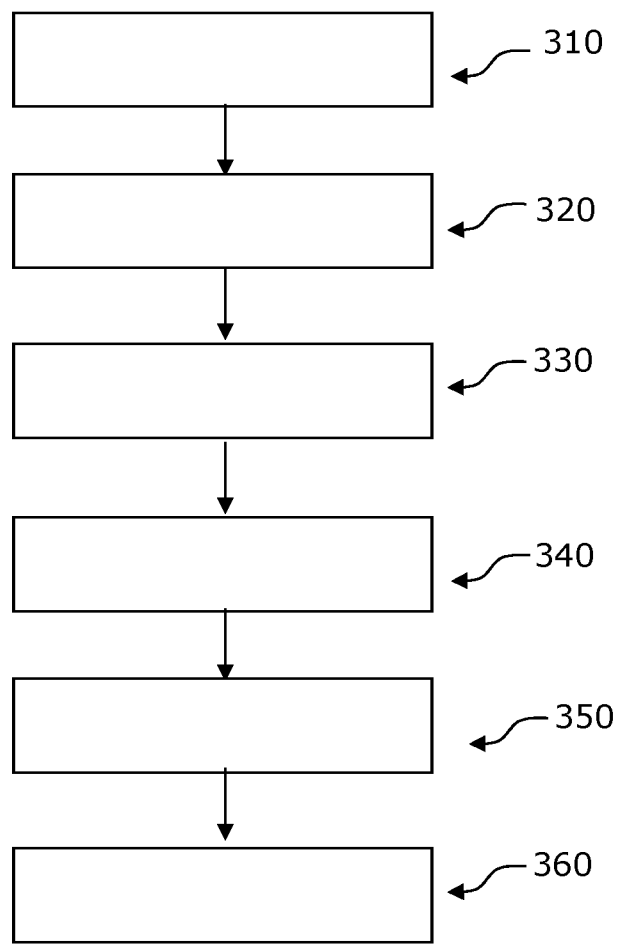
FIG. 3 is a block diagram including steps of a method for producing an ophthalmic tinted lens according to an embodiment of the invention.

With reference to FIG. 3, it is proposed embodiments of a method for optimizing the power correction of an ophthalmic tinted lens to be designed and produced. As detailed further on, it is also proposed with reference to FIG. 4, a method for optimizing the power correction of each of a first and a second ophthalmic tinted lenses 1, 1', intended for a first and a second eye of an identified wearer. It is also proposed with reference to FIG. 5, a method for optimizing the power correction of each of a first and a second ophthalmic tinted lenses 1, 1', intended for a first and a second eye of an identified wearer, taking into account the dominant eye of the wearer.

Optical Parameters

With reference to FIG. 3, at least one optical parameter value is provided at step 310.

Optical parameters values correspond to values that are prescribed by an ophthalmologist when the wearer needs glasses with optical power correction.

The optical parameters values are determined by the ophthalmologist with reference to a clear ophthalmic lens. A clear ophthalmic lens is considered as a non-tinted ophthalmic lens. Definition of a clear ophthalmic lens can be found in standard ISO 8980-3 (table 2, p 5).

In the state of the art, as explained above, when the wearer needs tinted ophthalmic lenses, for instance solar spectacles, the ophthalmic tinted lenses were designed by directly using the optical power values determined from the values of the optical parameters that had been prescribed in the context of designing a clear ophthalmic lens, what may lead to visual comfort issues for the wearer. As detailed further on, according to the proposed embodiments, for a lens or both lenses, at least one of the optical power values is reduced to provide at least one reduced optical power value that is intended to be used to design the ophthalmic tinted lens.

When the ophthalmic tinted lens to be designed and/or produced is a single vision lens, the prescribed optical parameter value(s) include(s) a prescribed sphere value, noted S, and/or a prescribed cylinder value, noted C.

When the ophthalmic tinted lens to be designed and/or produced is a progressive ophthalmic tinted lens, the prescribed optical parameter value(s) include(s) at least one of:
  a prescribed sphere value for far vision, noted Sfv;
  a prescribed sphere value for near vision, noted Snv;
  a prescribed cylinder value for far vision, noted Cfv;
  a prescribed cylinder value for near vision, noted Cnv;
  a prescribed addition, noted ADD: According to embodiments, an addition is defined as a difference between a mean sphere for near vision, noted Smean_nv, and a mean sphere for far vision, noted Smean_fv. A mean sphere can be calculated with the formula:

(Smin+Smax)/2 with Smin and Smax corresponding respectively to the minimum and maximum value of the sphere, wherein, when the prescribed optical parameter values include Sfv and Sfv+Cfv, then Smin=Sfv if Cfv>0 and Smin=Sfv+Cfv if Cfv<0, and when the prescribed optical parameter values include Snv and Snv+Cnv, then Smin=Snv if Cnv>0 and Smin=Snv+Cnv if Cnv<0. The mean sphere in far vision or near vision can also be defined as respectively Sfv+Cfv/2 or Snv+Cnv/2.

Prescribed optical parameter values can include various combination of these parameter values.

Usually, a prescription provided by an ophthalmologist includes:
- a prescribed sphere value for far vision Sfv, a prescribed cylinder value for far vision Cfv and a prescribed addition ADD, or
- a prescribed sphere value for far vision Sfv, a prescribed cylinder value for far vision Cfv, a prescribed sphere value for near vision Snv; and a prescribed cylinder value for near vision Cnv;

The sphere value for near vision Snv can be calculated as the sum of the sphere value for far vision Sfv and the addition ADD.

Optical Power Values

At step 320, at least one non-null optical power value is determined from said at least one prescribed optical parameter value.

Optical power values are non-null values that are determined based on a prescribed optical parameter value or a combination of prescribed optical parameter values.

When the ophthalmic tinted lens to be designed is a single vision, the determined non-null optical power value(s) include(s) a determined non-null sphere value, noted $S_{pow}$ and/or a determined non-null sum of a sphere and of a cylinder value, noted $(S+C)_{pow}$.

When the ophthalmic tinted lens to be designed is a progressive ophthalmic tinted lens, the determined non-null optical power value(s) include(s) at least one of:
- a determined non-null sphere value for far vision, noted $Sfv_{pow}$;
- a determined non-null sphere value for near vision, noted $Snv_{pow}$;
- a determined non-null sum of a sphere value for far vision and of a cylinder value for far vision, noted $(Sfv+Cfv)_{pow}$;
- a determined non-null sum of a sphere value for near vision and of a cylinder value for near vision, noted $(Snv+Cnv)_{pow}$;
- a determined non-null sum of a sphere value for far vision and of an addition, noted $(Sfv+ADD)_{pow}$;
- a determined non-null sum of a sphere value for far vision and of an addition and of a cylinder value for far vision, noted $(Sfv+Cfv+ADD)_{pow}$;
- a determined non-null sum of a sphere value for far vision and of an addition and of a cylinder value for near vision $(Sfv+Cnv+ADD)_{pow}$.

Determined non-null optical power values can include a combination of a plurality of above cited optical power values.

Reduction Value

In view of calculating at least one reduced optical power value among said at least one optical power value (as explained below), at least one reduction value is obtained at step 330.

According to a particular aspect, said at least one reduction value is between 0.125 and 0.75 diopter. A reduction value can thus be a constant value of 0.125, 0.25, 0.375, 0.5, or, preferably, 0.25 diopter, or any value between 0.125 and 0.75 diopter, with a step of 0.01 D.

According to embodiments, said at least one reduction value is read in a predefined table.

According to other embodiments, said at least one reduction value can be calculated as a function of a highest determined non-null optical power value among said at least one non-null optical power value.

According to embodiments for which a reduction of the diameter of the pupil (or corresponding increase in depth of focus due to the decrease in pupil diameter) is calculated, said reduction value may also be calculated in function of said calculated reduction of the diameter of the pupil. Reduction of the diameter of the pupil can be calculated by comparing, in predefined lighting conditions, the diameter of the pupil when the corresponding eye is provided with a lens with a predefined tinted ophthalmic filter, such as a classical sunglass filter that provides a sensibly homogeneous filtering effect for all the wavelengths of the visible spectral range, and the diameter of the pupil when said corresponding eye is provided with a lens that includes said turquoise blue ophthalmic filter.

For instance, a reduction value, noted RV can be calculated according to the formula:

$$RV = k * \text{DeltaPup}$$

with $1/8 < k < 1/2$, a preferred value for k being $k=1/4$, and with DeltaPup being the reduction of the diameter of the pupil, in millimeters.

In particular, a reduction value can be used to decrease one or more optical power whose value is, in absolute value, a maximum(highest) power value among the determined optical power value(s).

A reduced optical power value corresponds to a determined (initial) optical power whose value that is reduced to obtain said reduced optical power value that is then usable to design and produce the lens.

According to embodiments, when the highest optical power value is the absolute value of one optical power value, then the value of this optical power value is reduced with the reduction value.

According to embodiments, when the highest optical power value is the absolute value of a plurality of optical power values, then the value of one or a plurality of these optical power values is reduced. In case of a plurality of these optical power values to be reduced, the reduction value can be distributed on this plurality of optical power values to be reduced. In other word, part of the reduction can be applied on each one of the optical power values. The applied part can be equal or different from one optical power value to another.

According to a particular aspect, a reduction value can be determined in function of said maximum power value.

For instance, the below table can be used to determine the reduction value that has to be selected depending on said maximum power value, referred as to |P|max.

| Range in which |P|max is included | Reduction value: |
| --- | --- |
| [0-0.5] | 0.125 |
| ]0.5-2.5] | 0.25 |
| ]2.5-5.0] | 0.375 |
| >5.0 | 0.5 |

Following this exemplary table, if the maximum power value among the determined optical power values is 1, then the reduction value can be defined as being equal to 0.25.

Reduced Optical Power Value

At step 340, at least one reduced optical power value is calculated in function of said at least one non-null optical power value and said at least one reduction value. According to a preferred embodiment, said at least one reduced optical power value is calculated in function of the highest (maximum) value that can be found among the value(s) of said at least one non-null optical power value, and in function of said at least one reduction value.

According to embodiments, a reduced optical power value can be calculated as being equal to a determined non-null optical power value, taken in absolute value, minus a reduction value, the arithmetic sign of the reduced optical power value being the original arithmetic sign of the determined non-null optical power value.

At step 350, the ophthalmic tinted lens can be designed according to the reduced optical power value(s) and, if any, the remaining optical power value(s) that has or have not been reduced. The lens design corresponds to a geometry of the lens that complies with the optical power values determined from the initial optical power values and whose at least one optical power value includes a value that is reduced compared to the corresponding initial optical power value.

At step 360, the ophthalmic tinted lens can be produced according to the corresponding lens design, and by providing the lens with said turquoise blue ophthalmic filter 12. As explained above the tint can be obtained by applying a thin film corresponding to said ophthalmic filter 12, to the lens or by using a base 11 that is tinted in the mass for producing the lens with geometrical features corresponding to the defined design.

Production of the lens can be done by controlling a grinding machine, or a machine of another technology, according to the defined ophthalmic tinted lens design that can be memorized in a memory of the machine and read by a processor that controls one or more grinding tools according to a program including computer instructions that uses the defined ophthalmic tinted lens design as data inputs.

Examples of Calculation of at Least One Reduced Optical Power Value for a Single Vision Lens For the below examples, the reduction value is defined as being equal to 0.25. In the below table, the column entitled "Prescribed optical parameters" corresponds to the values of a list of prescribed optical parameters, noted S (C), with S being the prescribed sphere value, and C being the prescribed cylinder value.

The column entitled "Initial optical power values" includes two subcolumns corresponding to optical power values $S_{pow}$ and $(S+C)_{pow}$ determined on the basis of said list of prescribed optical parameters S(C). A third subcolumn is introduced to calculate the maximum power value among the determined optical power values $S_{pow}$ and $(S+C)_{pow}$.

The column "Optical power values for designing the lens" provides two subcolumn with optical power values $S'_{pow}$ and $(S+C)'_{pow}$ intended to be used for designing the lens, that respectively correspond to optical power values $S_{pow}$ and $(S+C)_{pow}$, but wherein at least one value is the result of a reduction of one of said optical power values $S_{pow}$ and $(S+C)_{pow}$. Thus at least one of these optical power values $S'_{pow}$ and $(S+C)'_{pow}$ corresponds to a reduction of at least one of the corresponding optical power values $S_{pow}$ or $(S+C)_{pow}$. A third subcolumn entitled "Reduced optical power value(s)" is introduced to indicate which optical power value(s) has(have) been reduced.

The optical power values $S'_{pow}$ and/or $(S+C)'_{pow}$ can then be used to design the ophthalmic tinted lens.

| Prescribed optical parameters | Initial optical power values | | | Optical power values for designing the lens | | Reduced optical power value(s) |
|---|---|---|---|---|---|---|
| S(C) | $S_{pow}$ | $(S+C)_{pow}$ | \|P\|Max | $S'_{pow}$ | $(S+C)'_{pow}$ | |
| −2.0 | −2.0 | −2.0 | \|S\| = \|S+C\| | −1.75 | −1.75 | $S_{pow}$ and $(S+C)_{pow}$ |
| +2.0 | +2.0 | +2.0 | \|S\| = \|S+C\| | +1.75 | +1.75 | $S_{pow}$ and $(S+C)_{pow}$ |
| +2.0 (−2.0) | +2.0 | 0.0 | S | +1.75 | 0.0 | $S_{pow}$ |
| −2.0 (−2.0) | −2.0 | −4.0 | \|S+C\| | −2.0 | −3.75 | $(S+C)_{pow}$ |
| +1.0 (−2.0) | +1.0 | −1.0 | \|S\| = \|S+C\| | +1.0 | −0.75 | $(S+C)_{pow}$ |
| +1.0 (−2.0) | +1.0 | −1.0 | \|S\| = \|S+C\| | +0.75 | −1.0 | $(S)_{pow}$ |
| +1.0 (−2.0) | +1.0 | −1.0 | \|S\| = \|S+C\| | +0.75 | −0.75 | $S_{pow}$ and $(S+C)_{pow}$ |

Taking the sixth row of the table as an example, the prescribed optical parameters values include a sphere S whose value is −2 and a cylinder C whose value is −2. Thus the optical power values include a sphere power value $S_{pow}$ that is also equal to −2, and a sum of the sphere and of the cylinder $(S+C)_{pow}$ that is equal to −4, so that the absolute maximum power value among $(S+C)_{pow}$ and $S_{pow}$ is equal to the absolute value of the optical power $(S+C)_{pow}$, i.e. 4.

Therefore the optical power value $(S+C)_{pow}$ is selected to be reduced with the reduction value 0.25 so that the resulting reduced optical power value $(S+C)'_{pow}$ is equal to −(4−0.25)=−3.75, while the optical power value $S'_{pow}$ remains equal to initial optical power value $S_{pow}$, i.e. −2.

Examples of Calculation of a Reduced Optical Power Value for a Progressive Ophthalmic Lens For these examples the reduction value is still defined as being equal to 0.25.

In this example, it is considered that the prescribed cylinder value for far vision is equal to the prescribed cylinder value for near vision, and simply noted C.

The sphere value in near vision can be calculated as Sfv+ADD, and the sum of the sphere value and of the cylinder value in near vision can be calculated as Sfv+C+ADD. A spherical equivalent in far vision can be calculated as Sfv+C/2. A spherical equivalent in near vision can be calculated as Sfv+C/2+ADD.

In the below table, the column entitled "Prescribed optical parameters" corresponds to the values of a list of prescribed optical parameters, noted Sfv(C) [ADD], with Sfv being the prescribed sphere in far vision, C being the prescribed cylinder value and ADD being the prescribed addition value.

The column entitled "Initial optical power values" includes four subcolumns corresponding to optical power values $Sfv_{pow}$, $(Sfv+C)_{pow}$, $(Sfv+ADD)_{pow}$ and $(Sfv+C+ADD)_{pow}$ determined on the basis of said prescribed optical parameters Sfv(C) [ADD].

The column "Optical power values for designing the lens" includes four subcolumns that provide the optical power values $Sfv'_{pow}$, $(Sfv+C)'_{pow}$, $(Sfv+ADD)'_{pow}$ and $(Sfv+C+ADD)'_{pow}$ for designing the lens that respectively correspond to power values $Sfv_{pow}$, $(Sfv+C)_{pow}$, $(Sfv+ADD)_{pow}$ and $(Sfv+C+ADD)_{pow}$, but with at least one value that corresponds to one of the optical power values $Sfv_{pow}$, $(Sfv+C)^{pow}$, $(Sfv+ADD)_{pow}$ and $(Sfv+C+ADD)_{pow}$ that has been reduced.

All or part of the optical power values $Sfv'_{pow}$, $(Sfv+C)'_{pow}$, $(Sfv+ADD)'_{pow}$ and $(Sfv+C+ADD)'_{pow}$ are then used to design the lens.

| Prescribed optical parameters: Sfv(C)[ADD] | Initial optical power values | | | | Optical Power values for designing the lens | | | |
|---|---|---|---|---|---|---|---|---|
| | $Sfv_{pow}$ | $(Sfv + C)_{pow}$ | $(Sfv + ADD)_{pow}$ | $(Sfv + C + ADD)_{pow}$ | $Sfv'_{pow}$ | $(Sfv + C)'_{pow}$ | $(Sfv + ADD)'_{pow}$ | $(Sfv + C + ADD)'_{pow}$ |
| +2.0 [2.0] | 2.0 | 2.0 | 4.0 | 4.0 | 2.0 | 2.0 | 3.75 | 3.75 |
| −2.0[2.0] | −2.0 | −2.0 | 0.0 | 0.0 | −1.75 | −1.75 | 0.0 | 0.0 |
| 2.0 (−2.0) [2.0] | 2.0 | 0.0 | 4.0 | 2.0 | 2.0 | 0.25 | 3.75 | 2.0 |
| −2.0 (−2.0) [2.0] | −2.0 | −4.0 | 0.0 | −2.0 | −2.0 | −3.75 | −0.25 | −2.0 |
| −2.0 (2.0) [2.0] | −2.0 | 0.0 | 0.0 | 2.0 | −1.5 | 0.25 | 0.25 | 2.0 |
| −2.0 (2.0) [2.0] | −2.0 | 0.0 | 0.0 | 2.0 | −2.0 | −0.25 | −0.25 | 1.5 |
| −2.0 (2.0) [2.0] | −2.0 | 0.0 | 0.0 | 2.0 | −1.75 | 0.0 | 0.0 | 1.75 |

In the above table the optical power values usable for designing the lens, that correspond to initial optical power values that have been reduced (with a standard value of 0.25) have been underlined and emphasized in bold.

Figure 4:
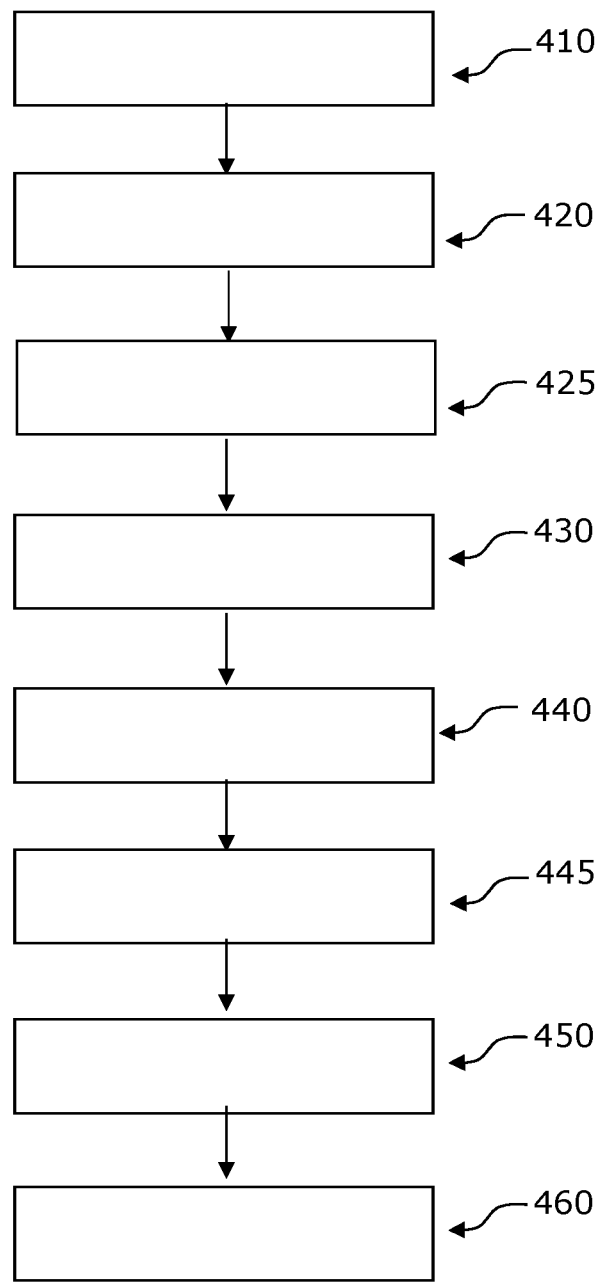
FIG. 4 is a block diagram including steps of a method for producing two lenses intended for the eyes of a wearer, according to an embodiment of the invention.

Method for Defining a Design of Each of a First and a Second Ophthalmic Tinted Lenses With reference to FIG. 4, it is proposed a method for defining a design of each of a first and a second ophthalmic tinted lenses 1, 1', intended for a first and a second eye of an identified wearer.

Each of said first and second ophthalmic tinted lenses 1, 1' to be designed, are intended to be provided with a turquoise blue ophthalmic filter 12 as proposed above. According to a preferred embodiment, the ophthalmic filter 12 of said first and second ophthalmic tinted lenses 1, 1' are substantially identical.

Said method comprises the following steps of, for each of said first and a second ophthalmic tinted lenses 1, 1'.

At step 410, it is provided at least one optical parameter value that is prescribed with reference to a clear ophthalmic lens. The description provided above for step 310 can apply to said step 410. At step 420, at least one non-null optical power value is determined from said at least one prescribed optical parameter value. The description provided above for step 320 can apply to said step 420.

Then at step 425, a highest optical power value is determined, in absolute terms, among the at least non-null optical power values that has or have been determined for both the first and the second ophthalmic tinted lenses 1, 1'.

Said method further comprises at step 430 the step of obtaining at least one reduction value. Said at least one reduction value can be obtained as proposed above for step 330. The reduction value can be obtained at various moments, and in particular in a step order that differs from the one proposed.

At step 440, for the one of said first and a second ophthalmic tinted lenses 1, 1', referred to as the main lens, to which is attached said highest optical power value, at least one reduced optical power value is calculated in function of said highest optical power value and said at least one reduction value.

According to embodiments, a reduced optical power value attached to the main lens is calculated as being equal to said highest optical power value (taken in absolute value) that is attached to the main lens minus a reduction value, in association with the original arithmetic sign of the determined non-null optical power value whose absolute value is said highest optical power value.

At step 445, for the other one of said first and a second ophthalmic tinted lenses 1, 1', referred to as the auxiliary lens, at least one another reduced optical power value is calculated in function of:

a non-null optical power value of at least one optical power of said auxiliary lens, said at least one optical power corresponding to the at least one optical power of the main lens whose non-null optical power value is said highest optical power value, and said at least one reduction value obtained for said main lens.

In other words, the maximum power value identified among the optical power value(s) of both lens, is reduced for at least one of the corresponding optical power(s) on the corresponding lens, and reduction is also applied on the value (that can differ from said maximum power value) of the corresponding optical power(s) of the other lens (whose type is the same than the one of said at least one optical power(s) of the main lens whose absolute value is maximum). Preferably the same reduction is applied for both lenses.

Then at step 450, a design for said main lens 1 is defined on the basis of said at least one reduced optical power value, and a design for said auxiliary lens 1' is defined on the basis of said at least one another reduced optical power value.

At step 460, each ophthalmic tinted lens can be produced according to the corresponding lens design, for instance as proposed above for step 360, and by providing the lens with said turquoise blue ophthalmic filter 12.

Examples for Defining a Design of Each of a First and a Second Ophthalmic Tinted Lenses, in the Case of Progressive Ophthalmic Lenses For the below examples, the reduction value is defined as being equal to 0.25 and it is considered that there is no prescribed cylinder value (or the value is null).

In the below table, the column entitled "Prescribed optical parameters" corresponds to the values of a list of prescribed optical parameters, noted SR; SL; ADD, with SR being the prescribed sphere value in far vision of the right lens, and SL being the prescribed sphere value in far vision for the left lens. ADD is the addition.

The column entitled "Initial optical power values" includes four subcolumns corresponding to optical power values $SR_{pow}$; $SL_{pow}$; $(SR+C)_{pow}$ and $(SL+C)_{pow}$ determined on the basis of said list of prescribed optical parameters.

The column "Optical power values for designing the lens" provides four subcolumns with optical power values $SR_{pow}$; $SL'_{pow}$; $(SR+C)'_{pow}$ and $(SL+C)'_{pow}$ intended to be used for designing the lens, that respectively correspond to optical power values $SR_{pow}$; $SL_{pow}$; $(SR+C)_{pow}$ and $(SL+C)_{pow}$, but wherein at least one value is the result of a reduction of one of said optical power values $SR_{pow}$; $SL_{pow}$; $(SR+C)_{pow}$ and $(SL+C)_{pow}$.

Thus at least one of these optical power values $SR_{pow}$; $SL'_{pow}$; $(SR+C)'_{pow}$ and $(SL+C)'_{pow}$ corresponds to a reduction of at least one of the corresponding optical power values $SR_{pow}$; $SL_{pow}$; $(SR+C)_{pow}$ and $(SL+C)_{pow}$.

Part or all of the optical power values $SR_{pow}$; $SL'_{pow}$; $(SR+C)'_{pow}$ and $(SL+C)'_{pow}$ can then be used to design the ophthalmic tinted lens.

| Prescribed optical parameters: SR; SL; ADD | Initial optical power values | | | | Optical Power values for designing the lens | | | |
|---|---|---|---|---|---|---|---|---|
| | $SR_{pow}$ | $SL_{pow}$ | $(SR+ADD)_{pow}$ | $(SL+ADD)_{pow}$ | $SR'_{pow}$ | $SL'_{pow}$ | $(SR+ADD)'_{pow}$ | $(SL+ADD)'_{pow}$ |
| +2.0; +1.0; 2.0 | 2.0 | 1.0 | 4.0 | 3.0 | 2.0 | 1.0 | 3.75 | 2.75 |
| −2.0; −1.0; 2.0 | −2.0 | 1.0 | 0.0 | 1.0 | −1.75 | −0.75 | 0.0 | 1.0 |
| −2.0; 0.0; 2.0 | −2.0 | 0.0 | 0.0 | 2.0 | −1.75 | 0.25 | 0.0 | 2.0 |
| −2.0; 0.0; 2.0 | −2.0 | 0.0 | 0.0 | 2.0 | −2.0 | 0.0 | −0.25 | 1.75 |
| −2.0; 0.0; 2.0 | −2.0 | 0.0 | 0.0 | 2.0 | −1.875 | 0.125 | −0.125 | 1.875 |

The maximum power value (in absolute term) is determined among the optical power values SRpow; SLpow; (SR+C)pow and (SL+C)pow. Then the reduction, here 0.25, is applied for a lens (the first lens) on at least one of the optical power(s) whose absolute value correspond to said maximum power value. The reduction is also applied for the other (second) lens on the value of the same optical power(s) than the one(s) reduced for the first lens. Reduced optical power value(s) intended to be used for designing the lenses are thus obtained.

For instance, taking the third row of the above table, the prescribed optical parameters include a sphere SR for the right lens whose value is +2, a sphere SL for the left lens whose value is +1 and an addition ADD, whose value is +2.

Therefore, the initial optical power values (SR+ADD)pow and (SL+ADD)pow are determined to be respectively equal to 2+2=+4 and 2+1=+3, while the initial optical power values SRpow and SLpow are respectively equal to the values of prescribed SR and SL, i.e. respectively +2 and +1.

Thus, the highest maximal power value among the values of the determined initial optical power values is the value +4 of the initial optical power value (SR+ADD)pow attached to the right lens.

Therefore, this initial optical power value (SR+ADD)pow is reduced by the reduction value (here 0.25) to provide a value of the corresponding optical power for designing the lens (SR+ADD)'pow that is equal to +(4−0.25)=+3.75.

Then the initial optical power (SR+ADD)pow being of the type of a sum of a sphere and an addition, the value of the initial optical power of the same type attached to the right lens, i.e. (SL+ADD)pow, is also reduced to provide a value of the corresponding optical power for designing the lens (SL+ADD)'pow that is equal to +(3−0.25)=+2.75.

Then the values of (SR+ADD)'pow and (SL+ADD)'pow that are reduced compared to initial optical power values (SR+ADD)pow and (SL+ADD)pow can be used for respectively designing the right lens and the left lens, along with the values SR'pow and SL'pow whose values remain unchanged compared to SRpow and SLpow.

Method Taking into Account the Dominant Eye of the Wearer

Figure 5:
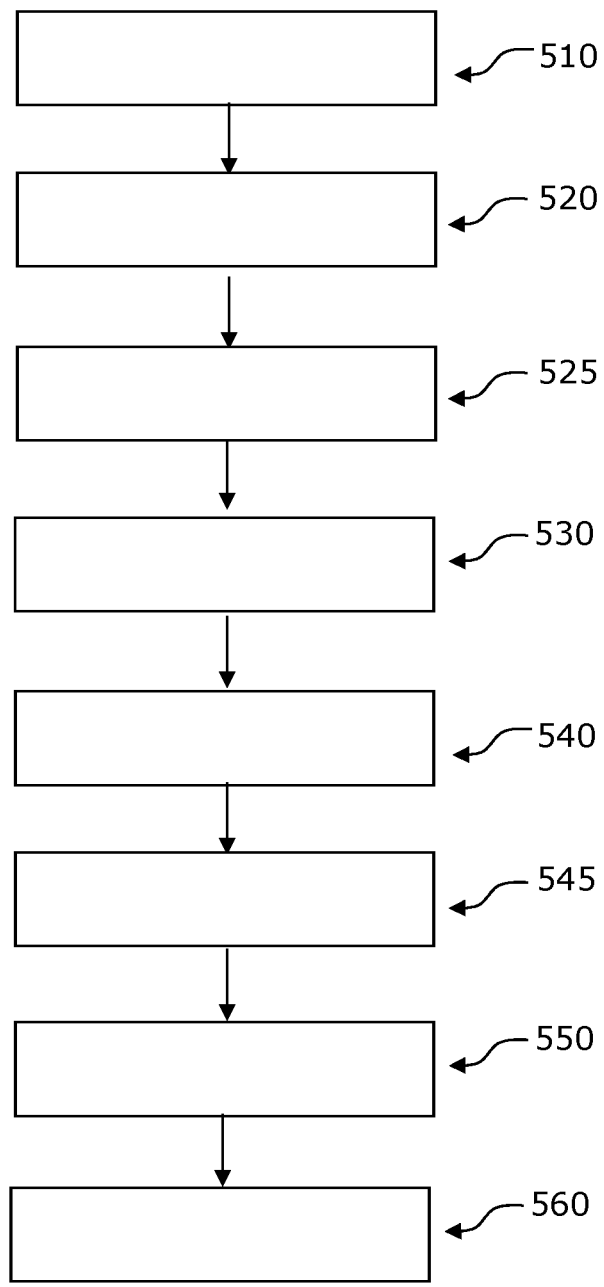
FIG. 5 is a block diagram including steps of a method for producing two lenses intended for the eyes of a wearer, according to another embodiment of the invention that takes into account the dominant eye of the wearer.

With reference to FIG. 5, it is proposed another method for defining a design of each of a first and a second ophthalmic tinted lenses 1, 1', intended for a first and a second eye of an identified wearer, taking into account the dominant eye of the wearer.

As for the above embodiment related to FIG. 4, each of said first and second ophthalmic tinted lenses 1, 1' to be designed, are intended to be provided with a turquoise blue ophthalmic filter 12 as proposed above. According to a preferred embodiment, the ophthalmic filter 12 of said first and second ophthalmic tinted lenses 1, 1' are substantially identical.

In this embodiment, it is considered that the first eye, i.e. the one to be associated with the first lens, is a dominant eye.

A dominant eye is an eye with "Ocular dominance" that is defined for example in the Dictionary of visual science, 4th edition, D. Cline, H W Hofstetter, J R Griffin.

Said method comprises the following steps of, for each of said first and a second ophthalmic tinted lenses 1, 1'. At step 510, it is provided at least one optical parameter value that is prescribed with reference to a clear ophthalmic lens. The description provided above for step 310 or 410 can apply to said step 510. At step 520, at least one non-null optical power value is determined from said at least one prescribed optical parameter value. The description provided above for step 320 or 420 can apply to said step 520.

Then at step 525, for the first ophthalmic tinted lens 1 intended to the dominant eye, a highest optical power value is determined, in absolute terms, among the at least one non-null optical power values that has or have been determined for said first ophthalmic tinted lens 1 intended to the dominant eye.

Said method further comprises at step 530 the step of obtaining at least one reduction value. Said at least one reduction value can be obtained as proposed above for step 330 or 430. The reduction value can be obtained at various moments, and in particular in a step order that differs from the one proposed.

At step 540, for the first ophthalmic tinted lens 1 intended to the dominant eye, to which is attached said highest optical power value, at least one reduced optical power value is calculated in function of said highest optical power value and said at least one reduction value.

According to embodiments, a reduced optical power value attached to the dominant lens is calculated as being equal to said highest optical power value (taken in absolute value) that is attached to the main lens minus a reduction value, in association with the original arithmetic sign of the determined non-null optical power value whose absolute value is said highest optical power value.

At step 545, for the other lens 1', which is here the second ophthalmic tinted lens, at least one another reduced optical power value is calculated in function of:
- a non-null optical power value of at least one optical power of said second ophthalmic tinted lens, said at least one optical power corresponding to the at least one optical power of the first ophthalmic tinted lens whose non-null optical power value is said highest optical power value, and
- said at least one reduction value obtained for said first ophthalmic tinted lens intended to the dominant eye.

In other words, the maximum power value identified among the optical power value of the first lens intended to be designed for the dominant eye, is reduced for at least one of the corresponding optical power(s) on the corresponding lens, and reduction is also applied on the value (that can differ from said maximum power value) of the corresponding optical power(s) of the other lens (whose type is the same than the one of said at least one optical power(s) of the first lens whose absolute value is maximum). Preferably the same reduction is applied for both lenses.

Then at step 550, a design for said first ophthalmic tinted lens 1 intended to the dominant eye is defined on the basis of said at least one reduced optical power value, and a design for said second ophthalmic tinted lens 1' on the basis of said at least one another reduced optical power value.

At step 560, each ophthalmic tinted lens can be produced, for instance as proposed above for step 360, according to the corresponding lens design, and by providing the lens with said turquoise blue ophthalmic filter 12.

Various Aspects

Since the power correction can impact the visual comfort, it is of interest to benefit from the above proposed solutions to minimize the required power correction for an acceptable visual quality and comfort, in particular for outside dynamic activities, as sport.

Proposed embodiments enable to have ophthalmic solar lenses, provided with a turquoise blue filter that have a reduced power correction, enabling the wearer to benefit from better visual quality and comfort. Indeed, thanks to the turquoise blue filter, depth of focus is increased, then power correction can be reduced without compromising vision performance, and then distortion, in particular in dynamic situations, is reduced.

According to embodiments the or each lens can be a photochromic lens so that it becomes a sun lens at daylight conditions, having spectrum with a sufficient turquoise blue transmittance.

The above-described functions and steps may be implemented in the form of a computer program or via hardware components (e.g. programmable gate arrays). In particular the functions and the steps related to providing at least one optical parameter value; determining at least one non-null optical power value; obtaining at least one reduction value; calculating at least one reduced optical power value; and/or defining an ophthalmic tinted lens design may be performed or controlled by sets of computer instructions or modules implemented by a processor or a controller or they may be performed by dedicated electronic components of the field-programmable gate array (FPGA) or application-specific integrated circuit (ASIC) type. It is also possible to combine computer parts and electronic parts.

Note that the provision of at least one optical parameter value, can be done by using user input interface enabling a user to input data into a control unit. The lens design can correspond to output data that can be transmitted into the control unit of a gridding machine to produce the corresponding lens.

The computer programs, or computer instructions, may be contained in program storage devices, e.g. computer-readable digital data storage media, or executable programs. The programs or instructions may also be executed from program storage peripherals.

Although representative processes and articles have been described in detail herein, those skilled in the art will recognize that various substitutions and modifications may be made without departing from the scope of what is described and defined by the appended claims.

The invention claimed is:

1. A method for defining a design of an ophthalmic tinted lens provided with an ophthalmic filter having an average transmittance value over a range of wavelengths between 465-495 nm that is greater than a visual transmission value over a range of wavelengths 380-780 nm, said ophthalmic tinted lens being intended for an eye of a wearer, said method comprising:
- obtaining at least one optical parameter value that is prescribed with reference to a clear ophthalmic lens;
- determining at least one non-null optical power value from said at least one prescribed optical parameter value;
- obtaining at least one reduction value, said at least one reduction value being between 0.125 and 0.75 diopter;
- calculating at least one reduced optical power value in function of said at least one non-null optical power value and said at least one reduction value; and
- defining the ophthalmic tinted lens design on the basis of said at least one reduced optical power value;
- wherein the visual transmission value $T_V$ is computed using the following formula:

$$T_V = \frac{\int_{380nm}^{780nm} E_s(\lambda) \cdot V(\lambda) \cdot T(\lambda) \cdot d\lambda}{\int_{380nm}^{780nm} E_s(\lambda) \cdot V(\lambda) \cdot d\lambda}$$

where:
- $\lambda$ is a light wavelength within a visible range from 380 nm to 780 nm of a human vision;
- $T(\lambda)$ is a spectral transmittance value of the ophthalmic tinted lens at wavelength $\lambda$, expressed as a percentage value;
- $V(\lambda)$ is a value at wavelength $\lambda$ of a spectral sensitivity profile V of a human eye for photopic vision; and
- $E_s(\lambda)$ is a value at wavelength $\lambda$ of a spectral intensity distribution Es of a solar light.

2. The method according to claim 1, wherein a ratio defined by the average transmittance value divided by the visual transmission value is superior to 1.5.

3. The method according to claim 1, wherein the average transmittance value is higher than 32%.

4. The method according to claim 1, wherein the visual transmission value is lower than 18%.

5. The method according to claim 1, wherein said reduction value is read in a table or calculated as a function of a highest determined non-null optical power value among said at least one non-null optical power value.

6. The method according to claim 1, wherein, the ophthalmic tinted lens being a single vision ophthalmic tinted lens, said at least one prescribed optical parameter value includes at least one of:
 a prescribed sphere value, and
 a prescribed cylinder value; and
said at least one determined non-null optical power value includes at least one of:
 a determined non-null sphere value, and
 a determined non-null sum of a sphere and of a cylinder value.

7. The method according to claim 1, wherein, the ophthalmic tinted lens being a progressive ophthalmic tinted lens, said at least one prescribed optical parameter value includes at least one of:
 a prescribed sphere value for far vision,
 a prescribed sphere value for near vision,
 a prescribed cylinder value for far vision,
 a prescribed cylinder value for near vision, and
 a prescribed addition, and
said at least one determined non-null optical power value includes at least one of:
 a determined non-null sphere value for far vision,
 a determined non-null sphere value for near vision,
 a determined non-null sum of a sphere value for far vision and of a cylinder value for far vision,
 a determined non-null sum of a sphere value for near vision and of a cylinder value for near vision,
 a determined non-null sum of a sphere value for far vision and of an addition,
 a determined non-null sum of a sphere value for far vision and of an addition and of a cylinder value for far vision, and
 a determined non-null sum of a sphere value for near vision and of an addition and of a cylinder value for near vision.

8. The method according to claim 1, wherein, in calculating said at least one reduced optical power value, the method further includes:
 determining, in absolute terms, a highest optical power value among said at least one determined non-null optical power value; and
 calculating said at least one reduced optical power value in function of said highest optical power value and said at least one reduction value.

9. A method for producing an ophthalmic tinted lens, said method comprising:
 defining a design of an ophthalmic tinted lens provided with an ophthalmic filter by executing the method of claim 1;
 producing the ophthalmic tinted lens based on said defined ophthalmic tinted lens design and said ophthalmic filter.

10. A method for defining a design of each of a first and a second ophthalmic tinted lenses, intended for a first and a second eye of an identified wearer, each of said first and second ophthalmic tinted lenses being provided with an ophthalmic filter having an average transmittance value over a range of wavelengths between 465-495 nm that is greater than a visual transmission value over a range of wavelengths 380-780 nm, the method comprising, for each of said first and a second ophthalmic tinted lenses:
 obtaining at least one optical parameter value that is prescribed with reference to a clear ophthalmic lens;
 determining at least one non-null optical power value from said at least one prescribed optical parameter value; and
 determining, in absolute terms, a highest optical power value among the at least one non-null optical power value determined for both the first and the second ophthalmic tinted lenses;
 obtaining at least one reduction value, said at least one reduction value being between 0.125 and 0.75 diopter;
 for a main lens being one of said first and a second ophthalmic tinted lenses to which is attached said highest optical power value, calculating at least one reduced optical power value in function of said highest optical power value and said at least one reduction value;
 for an auxiliary lens being the other one of said first and a second ophthalmic tinted lenses, calculating, at least one another reduced optical power value in function of:
  a non-null optical power value of at least one optical power of said auxiliary lens, said at least one optical power corresponding to the at least one optical power of the main lens whose non-null optical power value is, in absolute terms, said highest optical power value, and
  said at least one reduction value; and
 defining a design for said main lens on the basis of said at least one reduced optical power value and defining a design for said auxiliary lens on the basis of said at least one another reduced optical power value;
 wherein the visual transmission value $T_V$ is computed using the following formula:

$$T_V = \frac{\int_{380nm}^{780nm} E_s(\lambda) \cdot V(\lambda) \cdot T(\lambda) \cdot d\lambda}{\int_{380nm}^{780nm} E_s(\lambda) \cdot V(\lambda) \cdot d\lambda}$$

where:
$\lambda$ is a light wavelength within a visible range from 380 nm to 780 nm of a human vision;
$T(\lambda)$ is a spectral transmittance value of the ophthalmic tinted lens at wavelength $\lambda$ expressed as a percentage value;
$V(\lambda)$ is a value at wavelength $\lambda$ of a spectral sensitivity profile V of a human eye for photopic vision; and
$E_s(\lambda)$ is a value at wavelength $\lambda$ of a spectral intensity distribution Es of a solar light.

11. A method for defining a design of each of a first and a second ophthalmic tinted lenses, intended for a first and a second eye of an identified wearer, each of said first and second ophthalmic tinted lenses being provided with an ophthalmic filter having an average transmittance value over a range of wavelengths between 465-495 nm that is greater than a visual transmission value over a range of wavelengths 380-780 nm, said first eye being a dominant eye, the method comprising, for each of said first and a second ophthalmic tinted lenses:
 obtaining at least one optical parameter value that is prescribed with reference to a clear ophthalmic lens;

determining at least one non-null optical power value from said at least one prescribed optical parameter value;

for the first ophthalmic tinted lens intended to the dominant eye, determining, in absolute terms, a highest optical power value among the at least one non-null optical power value determined for said first ophthalmic tinted lens intended to the dominant eye;

obtaining at least one reduction value, said at least one reduction value being between 0.125 and 0.75 diopter;

for the first ophthalmic tinted lens intended to the dominant eye, to which is attached said highest optical power value, calculating at least one reduced optical power value in function of said highest optical power value and said at least one reduction value;

for the second ophthalmic tinted lens, calculating at least one another reduced optical power value in function of:
 a non-null optical power value of at least one optical power of said second ophthalmic tinted lens, said at least one optical power corresponding to the at least one optical power of the first ophthalmic tinted lens whose non-null optical power value is, in absolute terms, said highest optical power value, and
 said at least one reduction value; and defining a design for said first ophthalmic tinted lens on the basis of said at least one reduced optical power value; and defining a design for said second ophthalmic tinted lens on the basis of said at least one another reduced optical power value;

wherein the visual transmission value $T_V$ is computed using the following formula:

$$T_V = \frac{\int_{380nm}^{780nm} E_s(\lambda) \cdot V(\lambda) \cdot T(\lambda) \cdot d\lambda}{\int_{380nm}^{780nm} E_s(\lambda) \cdot V(\lambda) \cdot d\lambda}$$

where:
$\Delta$ is a light wavelength within a visible range from 380 nm to 780 nm of a human vision;
$T(\lambda)$ is a spectral transmittance value of the ophthalmic tinted lens at wavelength $\lambda$ expressed as a percentage value;
$V(\lambda)$ is a value at wavelength $\lambda$ of a spectral sensitivity profile V of a human eye for photopic vision; and
$E_s(\lambda)$ is a value at wavelength $\lambda$ of a spectral intensity distribution Es of a solar light.

12. The method of defining a design of each of a first and a second ophthalmic tinted lenses according to claim 8, intended for a first and a second eye of an identified wearer, wherein the ophthalmic filter of said first and second ophthalmic tinted lenses are substantially identical.

13. A method for producing a first and a second ophthalmic tinted lenses, said method comprising:
defining designs for said first ophthalmic tinted lens and said second ophthalmic tinted lens, by executing the method of claim 10;
producing the first ophthalmic tinted lens and the second ophthalmic tinted lens based on said defined designs and based on said ophthalmic filter provided for each of the first ophthalmic tinted lens and the second ophthalmic tinted lens.

14. A non-transitory computer readable medium including a computer program product comprising one or more stored sequences of instructions that are accessible to a processor and which, when executed by the processor, causes the processor to carry out the method according to claim 1.

15. An assembly comprising:
a document on which is provided at least one optical parameter value that is prescribed with reference to a clear ophthalmic lens; and
an ophthalmic tinted lens provided with an ophthalmic filter having an average transmittance value over a range of wavelengths between 465-495 nm that is greater than a visual transmission value over a range of wavelengths 380-780 nm,
wherein, the ophthalmic tinted lens being associated with said at least one prescribed optical parameter value, the ophthalmic tinted lens has at least one optical power value measured on said ophthalmic tinted lens that differs from a corresponding optical power value determined from said at least one prescribed optical parameter value, the difference between said corresponding optical power value determined from said at least one prescribed optical parameter value and said at least one optical power value measured on said ophthalmic tinted lens, referred to as a reduction value, being between 0.125 and 0.75 diopter;
wherein the visual transmission value $T_V$ is computed using the following formula:

$$T_V = \frac{\int_{380nm}^{780nm} E_s(\lambda) \cdot V(\lambda) \cdot T(\lambda) \cdot d\lambda}{\int_{380nm}^{780nm} E_s(\lambda) \cdot V(\lambda) \cdot d\lambda}$$

where:
$\lambda$ is a light wavelength within a visible range from 380 nm to 780 nm of a human vision;
$T(\Delta)$ is a spectral transmittance value of the ophthalmic tinted lens at wavelength $\lambda$ expressed as a percentage value;
$V(\lambda)$ is a value at wavelength $\lambda$ of a spectral sensitivity profile V of a human eye for photopic vision; and
$E_s(\lambda)$ is a value at wavelength $\lambda$ of a spectral intensity distribution Es of a solar light.

16. The assembly of claim 15, wherein the document is a paper.

* * * * *